United States Patent
Loop et al.

(10) Patent No.: US 6,716,276 B2
(45) Date of Patent: Apr. 6, 2004

(54) DESICCANT SYSTEM

(75) Inventors: Calvin L. Loop, deceased, late of Manhattan Beach, CA (US); by Robert C. Loop, legal representative, Thousand Oaks, CA (US); Bradley A. Wolk, Studio City, CA (US); Bernard Joseph Sullivan, San Marino, CA (US)

(73) Assignee: Desiccare, Inc., Pomona, CA (US)

( * ) Notice: Subject to any disclaimer, the term of this patent is extended or adjusted under 35 U.S.C. 154(b) by 0 days.

(21) Appl. No.: 10/178,973

(22) Filed: Jun. 25, 2002

(65) Prior Publication Data

US 2003/0121418 A1 Jul. 3, 2003

Related U.S. Application Data

(60) Provisional application No. 60/300,701, filed on Jun. 25, 2001.

(51) Int. Cl.$^7$ .............. B01D 53/04; B01D 53/26
(52) U.S. Cl. .............. 96/117.5; 96/135; 96/222
(58) Field of Search .............. 95/117; 96/4, 14, 96/108, 117.5, 134, 135, 222

(56) References Cited

U.S. PATENT DOCUMENTS

| | | | | |
|---|---|---|---|---|
| 2,210,862 A | * | 8/1940 | Tronstad | 96/154 |
| 2,554,879 A | * | 5/1951 | Race, Jr. | 96/117.5 |
| 2,716,338 A | * | 8/1955 | Blinn | 73/73 |
| 2,789,369 A | * | 4/1957 | Walker | 34/80 |
| 3,274,758 A | * | 9/1966 | Parman | 96/222 |
| 3,505,783 A | * | 4/1970 | Graham | 95/25 |
| 3,705,480 A | * | 12/1972 | Wireman | 96/117.5 |
| 3,841,484 A | * | 10/1974 | Domnick | 210/95 |
| 3,966,440 A | * | 6/1976 | Roberts | 96/117.5 |
| 3,990,872 A | * | 11/1976 | Cullen | 96/6 |
| 4,116,649 A | * | 9/1978 | Cullen et al. | 96/147 |
| 4,154,586 A | * | 5/1979 | Jones et al. | 96/117.5 |
| 4,177,048 A | * | 12/1979 | Rivers et al. | 96/117.5 |

FOREIGN PATENT DOCUMENTS

DE    40 25 589 A1  *  2/1992

* cited by examiner

Primary Examiner—Robert H. Spitzer
(74) Attorney, Agent, or Firm—Christie, Parker & Hale, LLP

(57) ABSTRACT

A desiccant system in which a body of water-vapor-adsorbing desiccant material is sealed in a bag which is permeable to water vapor, but not to liquid water or particulates. A humidity indicator is sealed to the bag, and is sensitive to humidity within the bag, but not to water or water vapor outside the bag. The indicator changes color when a predetermined humidity level has been reached within the bag, and thereby to signal that the bag should be replaced.

7 Claims, 1 Drawing Sheet

DESICCANT SYSTEM

CROSS REFERENCE TO RELATED APPLICATION

This application claims the benefit of U.S. Provisional Application No. 60/300,701 filed Jun. 25, 2001.

BACKGROUND OF THE INVENTION

This invention relates to a desiccant bag for adsorbing water vapor from a surrounding space, and having an integrated humidity indicating card which changes color when the adsorption capacity of the bag reaches a level where the bag should be discarded and replaced. The bag finds particular utility in adsorbing water vapor from spaces such as boat cabins and storage areas, stored automobiles, closets, drawers and other home spaces, and storage areas in a seaside location which are especially susceptible to high humidity and damage-causing condensed water.

SUMMARY OF THE INVENTION

The desiccant system of this invention comprises a desiccant material sealed in a bag made of a material, preferably spun-bonded polyolefin sheet material, which is permeable to water vapor, and impermeable to liquid water and particulates. A humidity indicator secured to an outer surface of the bag senses the humidity level within the bag, and signals, preferably by a color change, when the adsorbing ability of the desiccant material is exhausted and the moisture-adsorbing desiccant system should be discarded and replaced. The desiccant material may include pleasantly scented plastic beads.

DESCRIPTION OF THE PREFERRED EMBODIMENTS

Figure 2:
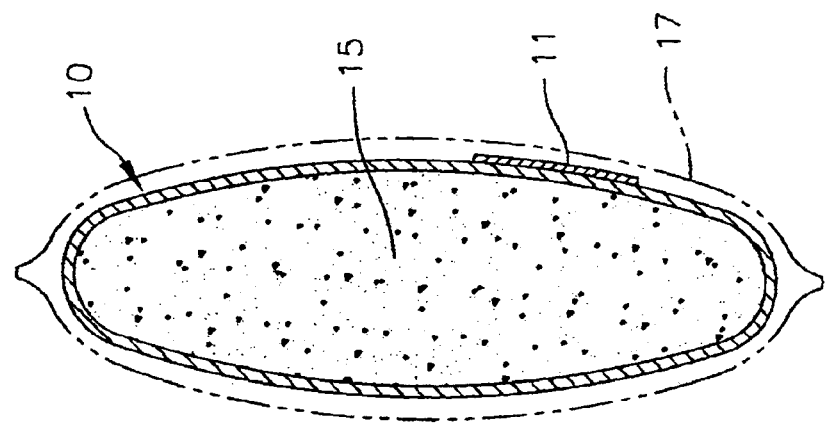
FIG. 2 is a sectional view on line 2—2 of FIG. 1, and additionally showing a foil container for storing the bag until it is to be used.
Figure 1:
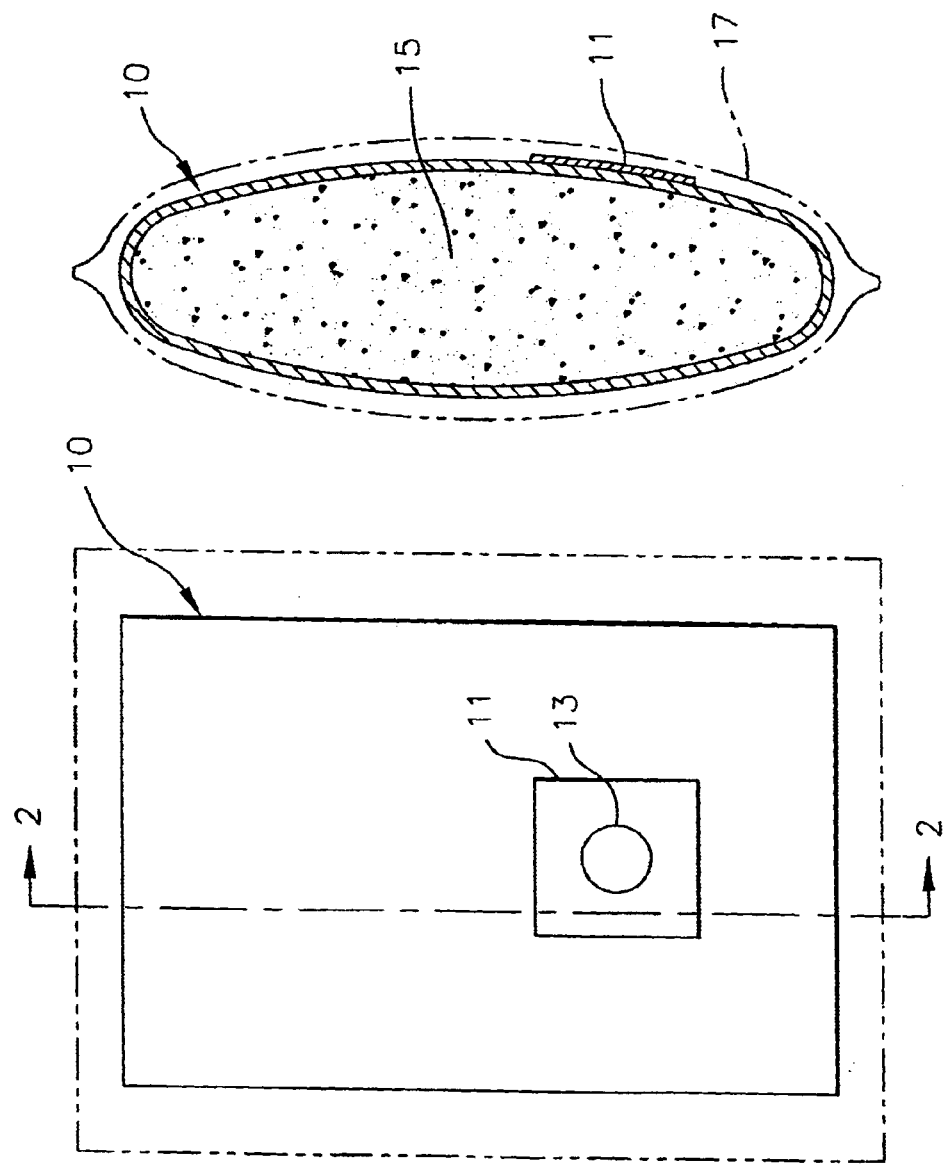
FIG. 1 is a front elevation of a desiccant bag according to the invention.

Referring to the drawings, a desiccant bag 10 is made of a porous material which is permeable to, and will pass water vapor, but is impervious to liquid water, dust, and other particulates. A preferred plastic sheet material for the bag is a spun-bonded polyolefin marketed by E. I. duPont under the trademark TYVEK® with a thickness in a range of 2.0 to 9.1 mils, and typically of about 5.3 mils.

A humidity indicator 11 is in the form of a self-adhesive rectangular card which is adhered to an outer surface of the bag. Only the rear surface of the card facing the bag outer surface senses humidity within the bag, and the card front surface is covered with a transparent and impervious plastic sheet to be isolated from the outside environment. Humidity indicators or markers of this type use a humidity-sensing color-change material 13 such as cobalt chloride, and are available from Desiccare, Inc., in Santa Fe Springs, Calif., assignee of the present invention. This material will change color from, for example, blue to pink or red when a specific humidity level (e.g., typically 50% or 60% depending on the application) is reached within the bag. The bag is then discarded, and replaced with a fresh desiccant bag.

The bag is filled with about six to seven ounces (for the illustrated bag size of about 8 to 9 inches high and about 4 to 4½ inches wide) of a desiccant material 15 of the following presently preferred formulation:

22% calcium chloride

30% Montmorillonite clay.

Balance of diatomacious earth which absorbs water.

About 5 grams of polyethylene pellets entrained with pleasantly scented material such as lemon oil are added to this mixture. Scented plastic beads of the type described above are available from Aroma Tech in Somerville, N.J., and Polyvel in Hammonton, N.J., and in a variety of long-life odorants which lend a pleasant aroma to the space in which the desiccant bag is located.

The bag can be economically assembled and loaded by a known production device called a "form, fill and seal machine." Humidity indicator 11 is adhered to a cut flat sheet of the Tyvek Bag material on a side which will become the bag outer surface. The sheet is then machine folded along its length to form a tube which is heat sealed along a side or back edge. The lower end of the bag is similarly heat sealed, and the bag is then loaded with desiccant material 15, following which the open upper end of the bag is heat sealed to completely enclose the desiccant. For shipment and storage before use, the completed bag is sealed in a foil bag 17 (FIG. 2) to be isolated from the outside environment.

The materials used in the bag and contents are nontoxic, and no disposal problems are presented when the indicator shows desiccant exhaustion. The bag is easily stored, handled, and placed in service, and provides a convenient, effective and economical means for humidity control and prevention of condensate water in storage areas to be protected.

What is claimed is:

1. A desiccant system, comprising a bag made of a material which is permeable to water vapor, and impermeable to liquid water and particulates, a desiccant material sealed in the bag, and a humidity indicator secured to the bag to sense humidity within the bag, and to be insensitive to water vapor outside the bag.

2. The system defined in claim 1 in which the humidity indicator changes color to signal when a predetermined humidity within the bag has been reached.

3. The system defined in claim 2, in which the humidity indicator is cobalt chloride.

4. The system defined in claim 1, in which the material of which the bag is made is a spun-bonded polyolefin sheet material.

5. The system defined in claim 1 in which the desiccant material comprises a mixture of calcium chloride, Montmorillonite clay, and diatomacious earth.

6. The system defined in claim 5, and in which the desiccant material further comprises scented plastic beads.

7. The system defined in any of the preceding claims, in which the humidity indicator is secured to an outer surface of the bag.

* * * * *